(12) United States Patent
Saka et al.

(10) Patent No.: US 7,619,668 B2
(45) Date of Patent: Nov. 17, 2009

(54) ABNORMALITY DETECTING APPARATUS FOR IMAGING APPARATUS

(75) Inventors: Masakazu Saka, Utsunomiya (JP);
Nobuharu Nagaoka, Nasukarasuyama (JP); Masahito Watanabe, Utsunomiya (JP); Hideki Hashimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 487 days.

(21) Appl. No.: 11/287,739

(22) Filed: Nov. 28, 2005

(65) Prior Publication Data

US 2006/0114318 A1 Jun. 1, 2006

(30) Foreign Application Priority Data

Nov. 30, 2004 (JP) ............................. 2004-347823

(51) Int. Cl.
  *H04N 9/64* (2006.01)
  *H04N 7/18* (2006.01)
(52) U.S. Cl. ........................ 348/251; 348/246; 348/125
(58) Field of Classification Search ................. 348/234, 348/243, 246, 247, 187, 180, 159, 148; 364/552; 382/149, 170, 104
See application file for complete search history.

(56) References Cited

U.S. PATENT DOCUMENTS

| | | | | |
|---|---|---|---|---|
| 4,433,385 A | * | 2/1984 | De Gasperi et al. | 382/149 |
| 5,521,673 A | | 5/1996 | Iwasaki | |
| 6,804,386 B1 | * | 10/2004 | Nakayama et al. | 382/141 |
| 6,940,550 B2 | * | 9/2005 | Kitawaki et al. | 348/246 |
| 7,130,448 B2 | * | 10/2006 | Nagaoka et al. | 382/104 |
| 7,349,119 B2 | * | 3/2008 | Tsukioka | 358/1.18 |
| 2001/0002936 A1 | * | 6/2001 | Tsuji et al. | 382/170 |

FOREIGN PATENT DOCUMENTS

| | | |
|---|---|---|
| JP | 6-30329 | 2/1994 |
| JP | 8-313632 | 11/1996 |
| JP | 11-328364 | 11/1999 |
| JP | 2000-030197 | 1/2000 |
| JP | 2000-232638 | 8/2000 |
| JP | 2001-6096 | 1/2001 |
| JP | 2001-211449 | 8/2001 |
| JP | 2001-211466 | 8/2001 |
| JP | 2001211449 A * | 8/2001 |
| JP | 2001-351200 | 12/2001 |
| JP | 2003-216937 | 7/2003 |

* cited by examiner

*Primary Examiner*—Nhan T Tran
*Assistant Examiner*—Ahmed A Berhan
(74) *Attorney, Agent, or Firm*—Carrier, Blackman & Associates P.C.; William D. Blackman; Joseph P. Carrier

(57) ABSTRACT

An abnormality detecting apparatus for an imaging apparatus that detects a presence of abnormalities in imaging apparatuses mounted on a vehicle to capture vehicle surroundings, which includes: a luminance variance value calculating device that calculates a luminance variance value of each image from the imaging apparatuses using the luminance value of each image from the imaging apparatuses obtained by the imaging apparatuses; and an abnormality detecting device that detects the presence of abnormalities in any of the imaging apparatuses in accordance with the luminance variance values calculated by the luminance variance value calculating device.

16 Claims, 11 Drawing Sheets

ABNORMALITY DETECTING APPARATUS FOR IMAGING APPARATUS

BACKGROUND OF THE INVENTION

1. Field of the Invention

The present invention relates to an abnormality detecting apparatus for an imaging apparatus that detects the presence of abnormal conditions (for example, grime in an optical system, etc.) in the imaging apparatus that can image, for example, in the visible light region or infrared region.

Priority is claimed on Japanese Patent Application No. 2004-347823, filed Nov. 30, 2004, the content of which is incorporated herein by reference.

2. Description of Related Art

There is conventionally known an apparatus that measures the quantity of reflected light in the light output from the headlights of a vehicle using a photosensor disposed in the proximity of an infrared camera mounted on the vehicle, and, based on the detected quantity of light, detects the presence of grime on the infrared camera (for example, refer to Japanese Unexamined Patent Application, First Publication No. 2001-211449).

In the apparatus according to an example of the aforementioned prior art, in addition to the infrared camera, it is necessary to provide the photosensor as a special apparatus for detecting the presence of grime on the infrared camera. There is therefore the possibility of the constitution of the apparatus becoming complicated and the installation position of the infrared camera being restricted in order to operate the photosensor in the desired state.

SUMMARY OF THE INVENTION

The present invention was made in view of the above-mentioned circumstances, and has as its object providing an abnormality detecting apparatus for an imaging apparatus that can easily detect the presence of abnormal conditions (for example, grime in an optical system, etc.) in an imaging apparatus, while preventing complication of the apparatus constitution.

In order to attain the object that solves the above-mentioned problem, the present invention provides an abnormality detecting apparatus for an imaging apparatus that detects a presence of abnormalities in imaging apparatuses mounted on a vehicle to capture vehicle surroundings, including: a luminance variance value calculating device that calculates a luminance variance value of each image from the imaging apparatuses using the luminance value of each image from the imaging apparatuses obtained by the imaging apparatuses; and an abnormality detecting device that detects the presence of abnormalities in any of the imaging apparatuses in accordance with the luminance variance values calculated by the luminance variance value calculating device.

The aforementioned abnormality detecting apparatus for an imaging apparatus can relatively detect the presence of abnormalities in each imaging apparatus regardless of the setting state of each imaging apparatus since it detects the presence of abnormalities in the imaging apparatuses in accordance with each luminance variance value of the plurality of images.

The abnormality detecting apparatus for an imaging apparatus of the present invention may further include a variance value difference calculating device that calculates a difference between the luminance variance values of images from each of the imaging apparatuses, wherein the abnormality detecting device detects the presence of abnormalities in any of the imaging apparatuses in accordance with the difference calculated by the variance value difference calculating device.

In this case, since the presence of abnormalities in the imaging apparatuses is detected in accordance with the difference between luminance variance values of images from each of the imaging apparatuses, the presence of abnormalities in each imaging apparatus can be easily detected.

The abnormality detecting device may detect the presence of abnormalities in any of the imaging apparatuses in accordance with the luminance variance value calculated by the luminance variance value calculating device, in addition to the difference calculated by the variance value difference calculating device.

In this case, since the presence of abnormalities in the imaging apparatuses are detected in accordance with the luminance variance values calculated by the luminance variance value calculating device in addition to the difference between luminance variance values of images from each of the imaging apparatuses, even when, for example, the difference between luminance variance values of images from each of the imaging apparatuses is not more than a specified value, when each luminance variance value of the plurality of images is less than a specified value, the corresponding imaging apparatuses can be determined as being in an abnormal state.

DETAILED DESCRIPTION OF THE INVENTION

Hereunder, an abnormality detecting apparatus for an imaging apparatus according to one embodiment of the present invention is described with reference to the drawings.

Figure 1:
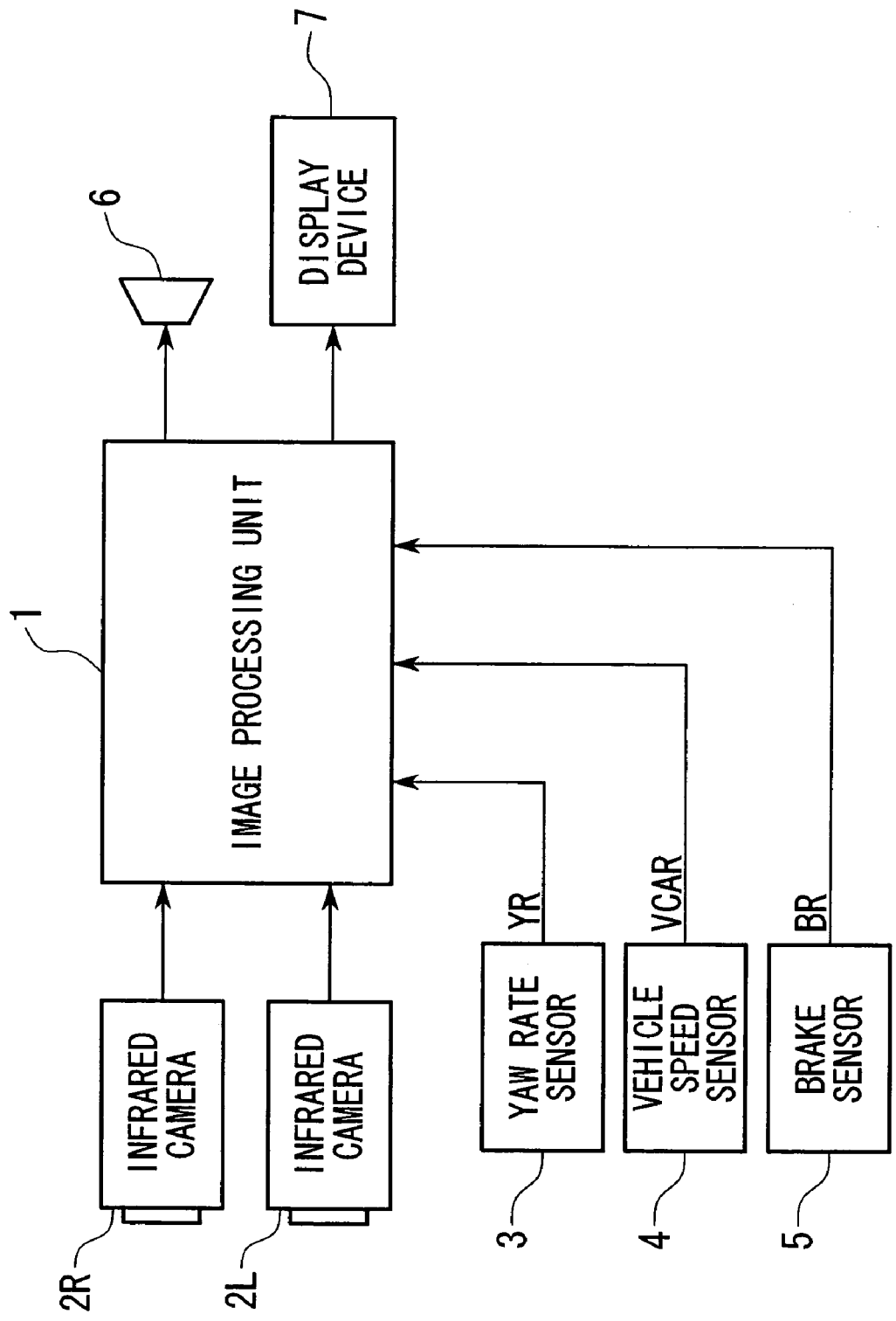
FIG. 1 is a block diagram showing the constitution of the abnormality detecting apparatus for an imaging apparatus according to an embodiment of the present invention.

The abnormality detecting apparatus for an imaging apparatus according to the present embodiment, for example as shown in FIG. 1, includes: an image processing unit 1 equipped with a CPU (Central Processing Unit) that controls the abnormality detecting apparatus for an imaging apparatus; two infrared cameras 2R and 2L that are capable of detecting distant infrared radiation; a yaw rate sensor 3 that detects the yaw rate of the vehicle; a vehicle speed sensor 4 that measures the traveling speed of the vehicle; a brake sensor 5 that detects a driver's braking operation; a loudspeaker 6; and a display apparatus 7. For example, the image processing unit 1 detects a moving object such as a pedestrian or an animal in front of the vehicle in its traveling direction from infrared images of the vehicle surroundings that are captured by the two infrared cameras 2R and 2L, and from detection signals relating to the traveling status of the vehicle that are detected by each of the sensors 3, 4, and 5. In the case where the possibility of a collision between the detected moving object and the vehicle is determined, a warning is output via the loudspeaker 6 or the display apparatus 7.

Moreover, the display apparatus 7 is, for example, constructed including a display apparatus integrated with gauges that display various traveling states of the vehicle, a display apparatus such as a navigation device, and furthermore an HUD (Head Up Display) 7a that displays various information at a position on the front window where the field of front vision of the driver is not impaired.

In addition, the image processing unit 1 includes an A/D converter, that converts input analog signals to digital signals, an image memory that stores digitized image signals (luminance values), a CPU (central processing unit) that performs various arithmetic processing, a RAM (Random Access Memory) that is used for storing data in the middle of the arithmetic processing, a ROM (Read Only Memory) that stores programs that are performed by the CPU and tables, maps and the like, and an output circuit that outputs drive signals for the loudspeaker 6 and display signals for the HUD 7a. The image processing unit 1 is constructed such that the output signals of the infrared cameras 2R and 2L, and the respective sensors, 3, 4, and 5 are input into the CPU after being converted to digital signals.

Figure 2:
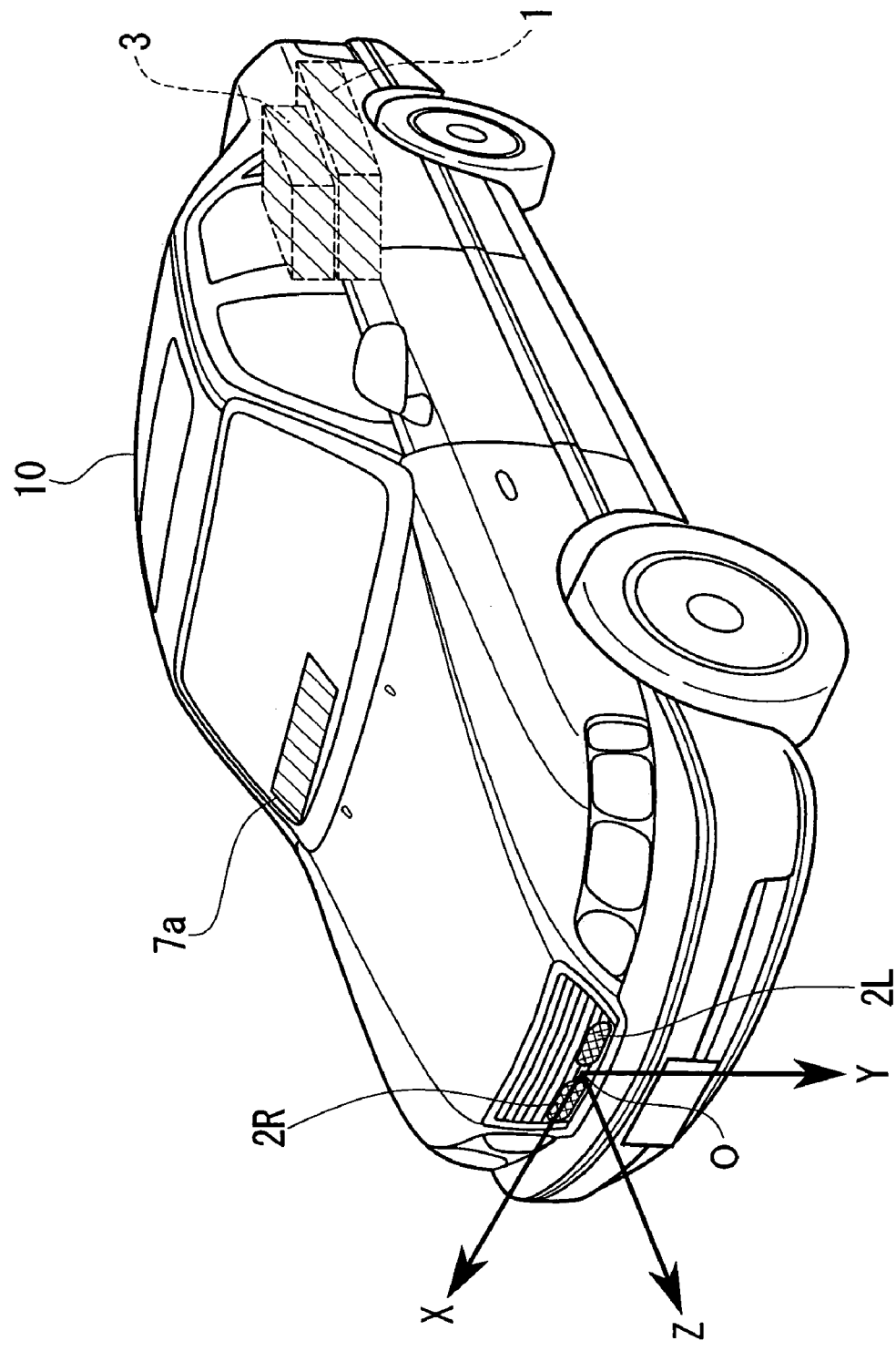
FIG. 2 is a diagram showing a vehicle equipped with the abnormality detecting apparatus for an imaging apparatus shown in FIG. 1.

Furthermore, as shown in FIG. 2, two infrared cameras 2R and 2L are disposed at the front of the vehicle 10 at positions symmetrical in the width direction relative to the central axis of the vehicle 10. The optical axes of both cameras 2R and 2L are parallel to each other, and both infrared cameras 2R and 2L are secured at the same height from the road surface. A characteristic of the infrared cameras 2R and 2L is that the output signal level (that is, luminance) increases as the temperature of the object increases.

Moreover, the HUD 7a is provided so as to display the images at a position on the front window of the vehicle 10, where the field of front vision of the driver is not impaired.

Figure 3:
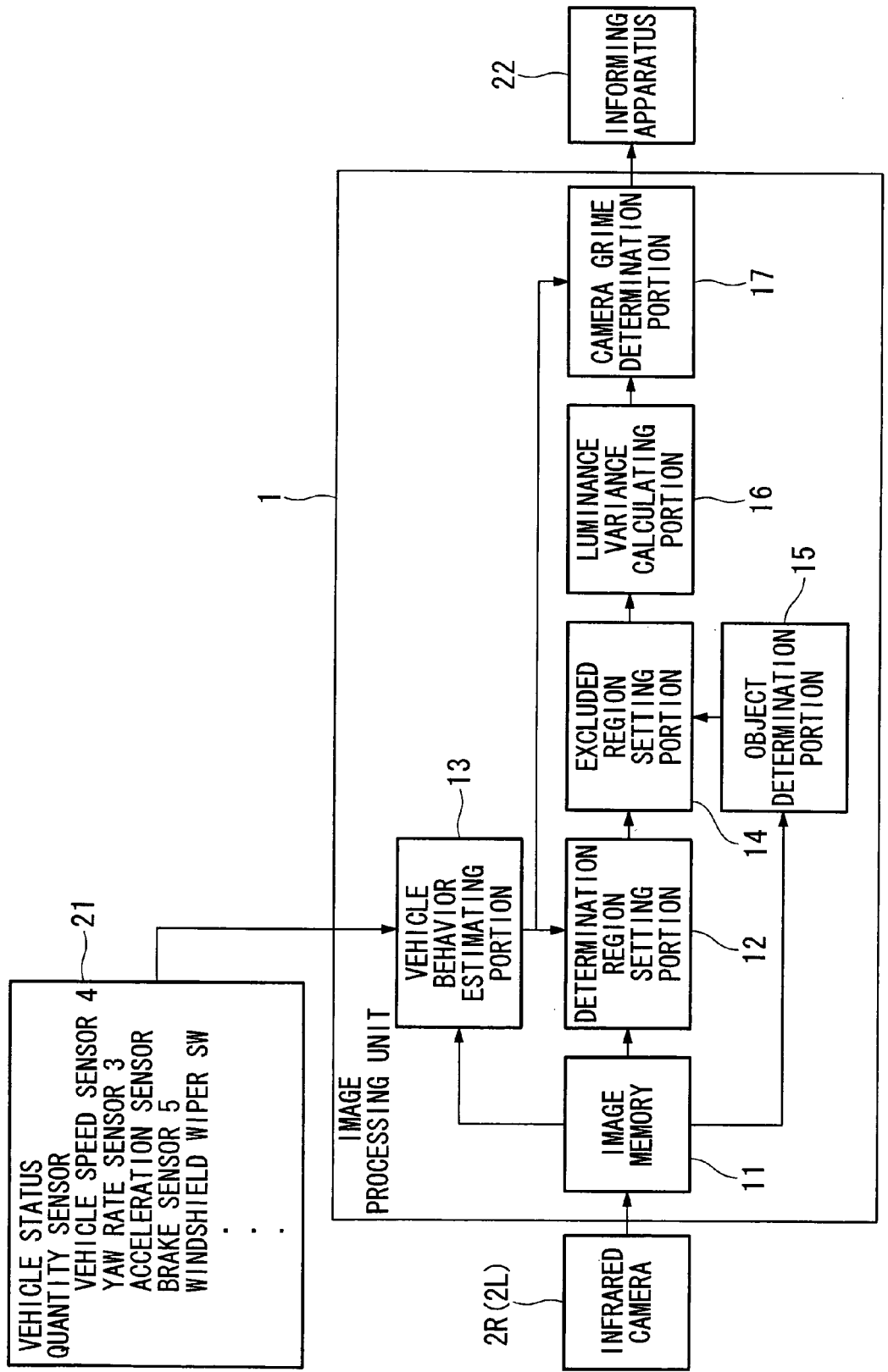
FIG. 3 is a lineblock diagram of the image processing unit shown in FIG. 1.

The image processing unit 1 is, as for example shown in FIG. 3, equipped with an image memory 11, a determination region setting portion 12, a vehicle behavior estimating portion 13, an excluded region setting portion 14, a luminance variance calculating portion 16 and a camera grime determination portion 17. In particular, the vehicle behavior estimating portion 13 of the image processing unit 1 has a yaw rate sensor 3, a vehicle speed sensor 4, and a brake sensor 5, as well as an acceleration sensor and a windshield wiper switch (windshield wiper SW). The detection signal output from a vehicle status quantity sensor 21 that detects various kinds of vehicle status quantities is input, and an informing apparatus 22 that has a loudspeaker 6 and a display apparatus 7 is connected to the camera grime determination portion 17 of the image processing unit 1.

In this image processing unit 1, the image memory 11 stores infrared images received from the infrared camera 2R (or 2L) as digital data.

The determination region setting portion 12 sets a determination region on the infrared image based on the optical design (for example, camera angle of view) and installation direction of the infrared camera 2R (or 2L) established in advance, and as required, corrects the determination region that is set based on the estimation result of the vehicle behavior estimating portion 13, for example, changes in the optical axis caused by displacement in the installation position of the infrared camera 2R (or 2L).

Figure 4:
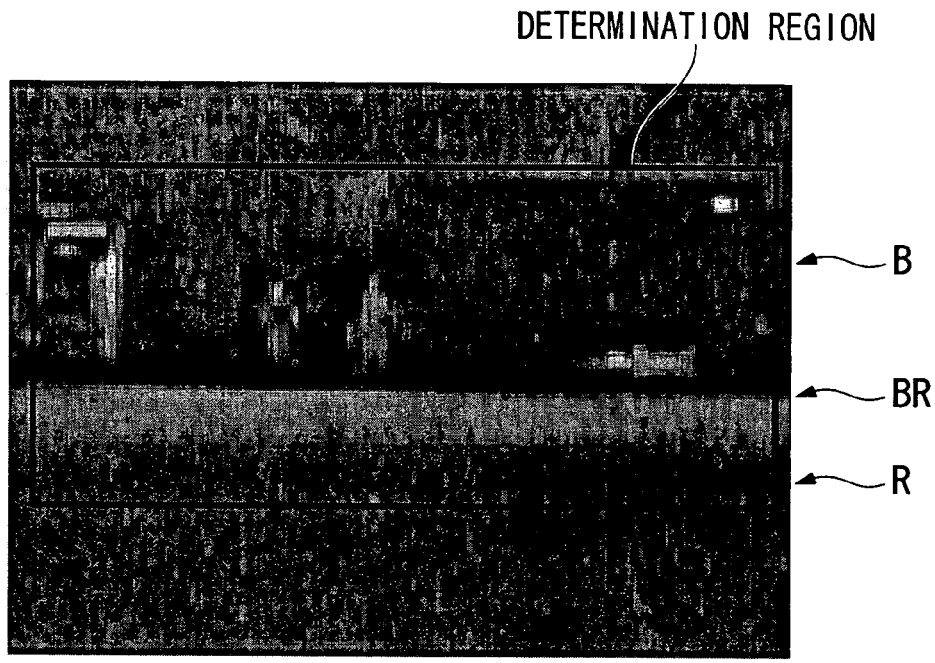
FIG. 4 is diagram showing an example of a determination region set on an infrared image.

As shown in FIG. 4, this determination region is a region that contains at least a road R, a boundary portion of the road BR and a background portion B. Here, if the region which contains only the background portion B upward on the infrared image without the road R and the boundary portion of the road BR is set as the determination region, regardless of the presence of grime on the infrared camera 2R (or 2L), in accordance with changes in the travel route (for example, changes between a suburban route with relatively few road structures and trees and the like and an urban route with relatively many road structures and trees and the like), the variance state of the luminance value in the specified region (for example, luminance variance value) fluctuates, and execution of grime determination that is described later becomes difficult, giving rise to the problem of the detection accuracy of grime determination and the reliability of the detection result dropping.

Also, if a region that includes only the road R in the lower portion of the infrared image without including the background portion B and the boundary portion of the road BR is set as the determination region, changes in the luminance value in the determination region become exceedingly small, and execution of grime determination, which is described later, becomes difficult, giving rise to the problem of the detection accuracy of grime determination and the reliability of the detection result dropping.

Based on the detection signal output from a vehicle status quantity sensor 21, the vehicle behavior estimating portion 13 calculates, as displacement in the installation position and installation direction of the infrared camera 2R (or 2L) set in advance, the pan angle indicating, for example, the displacement in the horizontal direction of the optical axis of the infrared camera 2R (or 2L) with respect to the vehicle traveling direction, or the pitch angle indicating, for example, displacement in the vertical direction of the optical axis of the infrared camera 2R (or 2L) with respect to the vehicle traveling direction that occurs due to pitching of the vehicle.

For example, the vehicle behavior estimating portion 13 calculates an approximated straight line LMV that approximates the relative movement track of a static object detected on an infrared image. With respect to the camera coordinate system (Xc, Yc, Zc) based on the optical axis of the infrared camera 2R (or 2L), the angle formed between a straight line formed by the approximated straight line LMV projected on the flat plane Xc-Zc and the Zc axis serves as the pan angle, and the angle formed between the straight line formed by the approximated straight line LMV projected on the flat plane Yc-Zc and the Zc axis serves as the pitch angle.

In addition, the camera coordinate system (Xc, Yc, Zc) is calculated as shown in the numerical expression (1), with the center position of the mounting position of the infrared cameras 2R and 2L in front of a vehicle 10 serving as the origin O, and the coordinates on the infrared image set so that the center of the infrared image is the origin, the horizontal direction is the x direction, and the vertical direction is the y direction. Furthermore, the coordinates (xc, yc) are the coordinates that have been converted from the coordinates (x, y) in the reference image (for example, the right image) into the coordinates in a virtual image obtained by aligning the origin O of the real space and the center of the image data so that they coincide, based on the relative position relationship between the mounting position of the infrared camera 2R and the origin O of the real space. Also, in the numerical expression (1) below, the distance between the vehicle 10 and the object, that is, the distance z (m), (object distance) from the lenses of the infrared cameras 2R and 2L to the object, is for example calculated based on the base length of the cameras, that is the horizontal distance D (m) between center positions of each imaging device of the infrared cameras 2R and 2L, the focus distance of the camera, that is, the focus distance f (m) of each lens of the infrared cameras 2R and 2L, the pixel pitch p (m/pixel), and parallax Δd (pixel) at pixel level.

$$\begin{bmatrix} Xc \\ Yc \\ Zc \end{bmatrix} = \begin{bmatrix} xc \times z/F \\ yc \times z/F \\ z \end{bmatrix}$$

$$z = \frac{f \times D}{\Delta d \times p}$$

$$F = \frac{f}{p}$$

(1)

Within the determination region set by the determination region setting portion 12, the excluded region setting portion 14 excludes from the grime determination target region, which is described later, regions of high luminance in which the luminance value is not less than a specified luminance value set in accordance with the luminance gain or luminance level of the infrared camera 2R (or 2L) set in advance or suitably changed.

Figure 5:
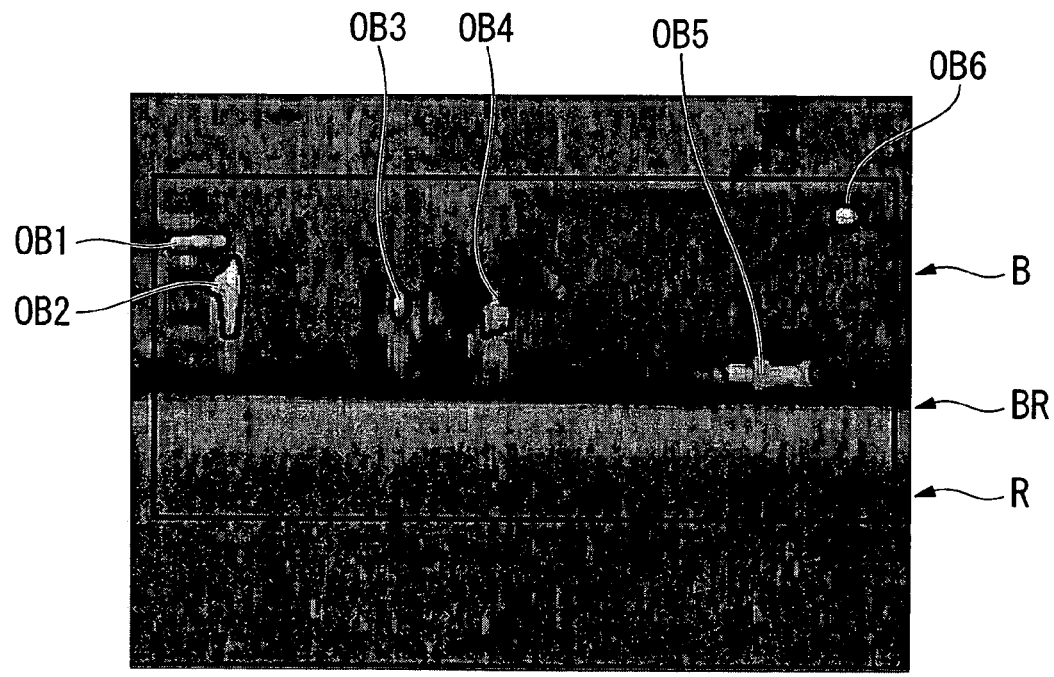
FIG. 5 is a diagram showing examples of excluded regions set within the determination region shown in FIG. 4.

For example, as shown in FIG. 5, the excluded region setting portion 14 sets as excluded regions those regions OB1, . . . , OB6 having a luminance value not less than a predetermined luminance within the determination region on the infrared image.

Moreover, in the case of a specified heating element detected by an object determination portion 15 (for example, an exhaust pipe or vending machine and the like) existing within the determination region on the infrared image, the excluded region setting portion 14 sets the region containing this heating element as an excluded region.

For the region other than the excluded regions set by the excluded region setting portion 14 within the determination region set by the determination region setting portion 12, the luminance variance calculating portion 16 first calculates a luminance histogram that is a frequency variance with respect to luminance value, and then calculates the variance (luminance variance) of the luminance histogram.

The camera grime determination portion 17 determines whether or not grime was generated in the infrared camera 2R (or 2L) based on the average value of a plurality of luminance variances (luminance variance average value) calculated by the luminance variance calculating portion 16 over a specified time for example.

Figure 6:
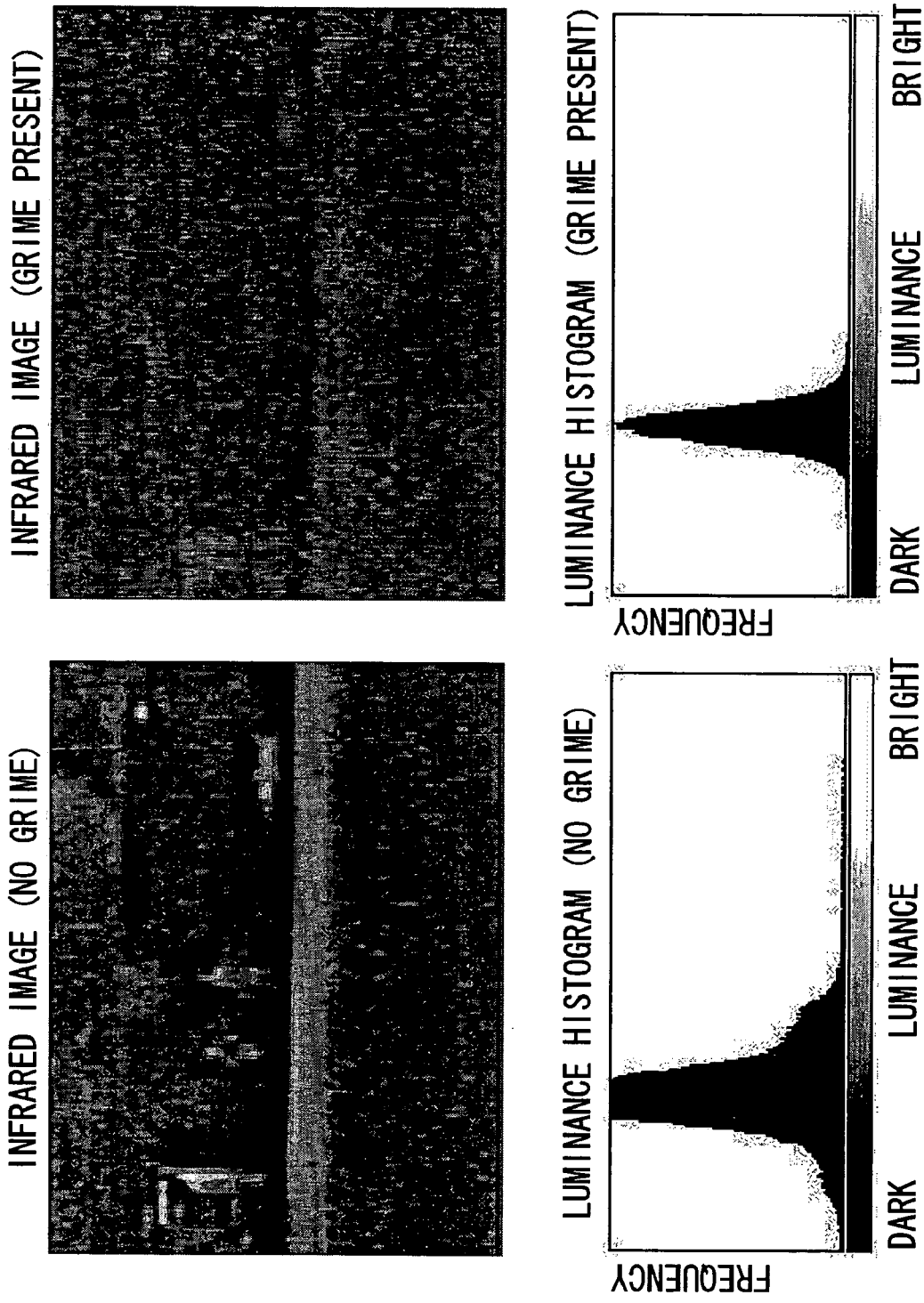
FIG. 6 is a diagram showing an example of the change in an infrared image and luminance histogram depending on the presence/absence of grime.

For example, the camera grime determination portion 17 determines whether or not the calculated luminance variance average is less than a specified variance threshold (for example, a value which has hysteresis) set in accordance with the luminance gain or luminance level of the infrared camera 2R (or 2L) set in advance or suitably changed. And when this determination result is "YES", as shown for example in FIG. 6, it is determined that the contrast (light-and-darkness difference) of the infrared image has dropped and the luminance variance value has fallen due to the occurrence of grime in the optical system of the infrared camera 2R (or 2L), and so grime is determined as existing in the infrared camera 2R (or 2L). Meanwhile, when this determination result is "NO", it is determined that there is no grime in the infrared camera 2R (or 2L).

In addition, when calculating the luminance variance average value, the camera grime determination portion 17, based on the detection signal output from the vehicle status quantity sensor 21, selects a suitable luminance variance from the plurality of luminance variances, being enabled to calculate the luminance variance average value solely from the selected luminance variance.

For example, by selecting the luminance variance calculated in a state in which the traveling behavior of the vehicle is relatively stable, or selecting the luminance variance calculated in a state in which the vehicle speed is not less than a specified speed, the camera grime determination portion 17 can curb decreases in the luminance variance caused by, for example, the distance between the vehicle and a preceding vehicle or a structure becoming relatively short in the state of a relatively low vehicle speed, thereby causing the area of the single preceding vehicle or object to increase excessively on the infrared image.

When it is determined by the camera grime determination portion 17 that grime is present in the infrared camera 2R (or 2L), the informing apparatus 22 outputs an audible warning such as an alarm sound or alarm voice via the loudspeaker 6 or a visual warning such as a display via the display apparatus 7.

In addition, the camera grime determination portion 17 determines whether or not there is the state of determination that grime exists in the infrared camera 2R (or 2L) caused by the weather, such as a rainfall and snowfall, based on the detection signal according to ON/OFF of actuation of the windshield wiper output from the windshield wiper switch (windshield wiper SW) of the vehicle status quantity sensor 21. When this determination result is "YES", it alters the information content from the informing apparatus 22 or temporarily suspends the process that determines the presence of grime.

The abnormality detecting apparatus for an imaging apparatus according to the present embodiment is provided with the construction described above. Next, the operation of the abnormality detecting apparatus for an imaging apparatus, particularly the process to determine the presence of grime in the infrared camera 2R (or 2L), is described with reference to the drawings.

Figure 7:
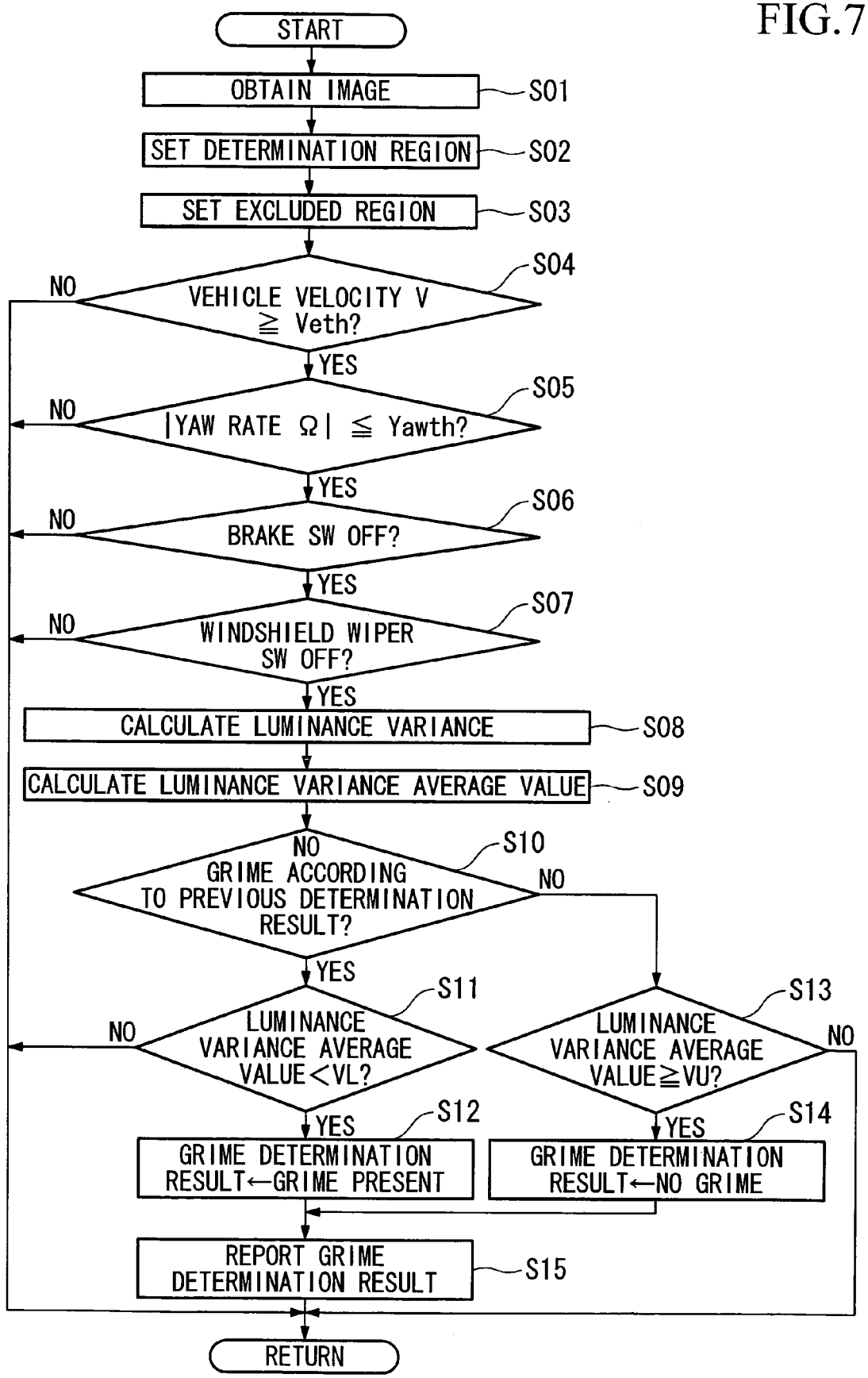
FIG. 7 is a flowchart showing the operation of the abnormality detecting apparatus for an imaging apparatus shown in FIG. 1.

First of all, in step S01 shown in FIG. 7, an infrared image is obtained from the infrared camera 2R (or 2L).

Next, in step S02, a determination region including at least the road R, the boundary portion of the road BR and the background portion B is set on the obtained infrared images.

Next, in step S03, high luminance regions in which the luminance value is not less than a prescribed luminance value are set as excluded regions within the determination region that is set.

Next, in step S04, it is determined whether a vehicle speed V measured by the vehicle speed sensor 4 is not less than a specified threshold speed Veth.

When this determination result is "NO", the processing is terminated.

On the other hand, when the determination result is "YES", the flow proceeds to step S05.

In step S05, it is determined whether or not the absolute value of the yaw rate ω detected by the yaw rate sensor 3 is not higher than a specified threshold value Yawth.

When the determination result of step S05 is "NO", the processing is terminated.

On the other hand, when the determination result of step S05 is "YES", the flow proceeds to step S06.

Then, in step S06, it is determined whether or not the state of the brake SW, which depends on a driver's braking operation detected by the brake sensor 5, is OFF.

When this determination result is "NO", the processing is terminated.

On the other hand, when the determination result is "YES", the flow proceeds to step S07.

Then, in step S07, it is determined whether or not the windshield wiper SW is OFF.

When this determination result in step S07 is "NO", the processing is terminated.

On the other hand, when the determination result in step S07 is "YES", the flow proceeds to step S08.

Then, in step S08, a luminance histogram is calculated for the region other than the excluded regions within the determination region, and the variance of the luminance histogram (luminance variance) is calculated.

Next, in step S09, the average value of a plurality of luminance variances (luminance variance average value) calculated over a specified time is calculated.

Next, in step S110, it is determined whether or not it was determined in the previous process whether there is no grime in the infrared camera 2R (or 2L).

When this determination result is "NO", the flow proceeds to step S13 that is described later.

On the other hand, when the determination result is "YES", the flow proceeds to step S11.

In step S11, it is determined whether or not the luminance variance average value is less than a specified lower limit variance threshold value VL set in accordance with the luminance gain or luminance level of the infrared camera 2R (or 2L) set in advance or suitably changed.

When this determination result is "NO", the processing is terminated.

On the other hand, when the determination result is "YES", the flow proceeds to step S12.

In step S12, as the grime determination result it is set that there is grime, and the flow proceeds to step S15 that is described later.

Also, in step S13, it is determined whether or not the luminance variance average value is not less than a predetermined upper limit variance threshold value VU set in accordance with the luminance gain or luminance level of the infrared camera 2R (or 2L) set in advance or suitably changed.

When this determination result is "NO", the processing is terminated.

On the other hand, when the determination result is "YES", the flow proceeds to step S14.

In step S14, as the grime determination result it is set that there is no grime, and the flow proceeds to step S15.

In step S15, the grime determination result is reported to the driver of the vehicle via the informing apparatus 22, and the processing is terminated.

As described above, the abnormality detecting apparatus for an imaging apparatus according to the present embodiment sets a region on the infrared image that includes at least a road R, a boundary portion of the road BR and a background portion B as the determination region, for which the luminance variance value is calculated. Therefore, the detection accuracy when detecting the presence of grime on the infrared cameras 2R and 2L according to the luminance variance value and the reliability of the detection result can be improved.

Moreover, since regions that may excessively raise the luminance variance value of the specified region, that is, regions whose luminance value is not less than a specified luminance value, or regions that include objects of a type that may cause excessive fluctuation in the luminance variance value of the specified region (for example, an exhaust pipe of another vehicle or a vending machine and the like) can be set as excluded regions, detection of the presence of grime on the infrared cameras 2R and 2L according to the luminance variance value can be properly performed.

Also, by determining whether or not the average value of luminance variances values calculated over a plurality of times exceeds a certain threshold (the lower limit variance threshold value VL or the upper limit variance threshold value VU) (that is, whether it is less than the lower limit variance threshold value VL or not less than the upper limit variance threshold value VU), the detection accuracy when detecting the presence of grime on the infrared cameras 2R and 2L and the reliability of the detection result can be improved regardless of the vehicle surroundings environment which changes with travel of the vehicle.

Moreover, by calculating the average value of luminance variance values based only on the luminance variance values calculated in the state of the status quantity of the vehicle being a certain status quantity (for example, the vehicle velocity V being not less than a specified threshold velocity Veth, the yaw rate ω being not higher than a specified threshold value Yawth, and the brake SW being OFF), detection of the presence of grime on the infrared cameras 2R and 2L based on an improper luminance variance value caused by the state of the vehicle can be prevented.

In addition, in the embodiment described above, although the presence of grime on the infrared camera 2R (or 2L) was determined according to whether or not a luminance variance average value is less than a specified variance threshold, it is not limited thereto. For example, it may be determined whether or not the difference between a specified reference luminance variance value (for example, a luminance variance average value) and a luminance variance calculated by the luminance variance calculating portion 16 is less than a specified threshold difference set in accordance with the luminance gain or luminance level of the infrared camera 2R (or 2L) set in advance or suitably changed. When this determination result is "NO", then it is determined that grime exists on the infrared camera 2R (or 2L), and on the other hand when the determination result is "YES", it is determined that there is no grime on the infrared camera 2R (or 2L).

In addition, in the embodiment described above, although grime determination was carried out independently for each infrared camera 2R and 2L, it is not limited thereto. For example, grime determination may be performed based on the determination result for the infrared camera 2R (hereafter referred to as the first infrared camera 2R) and the determination result for the infrared camera 2L (hereafter referred to as the second infrared camera 2L).

Figure 8:
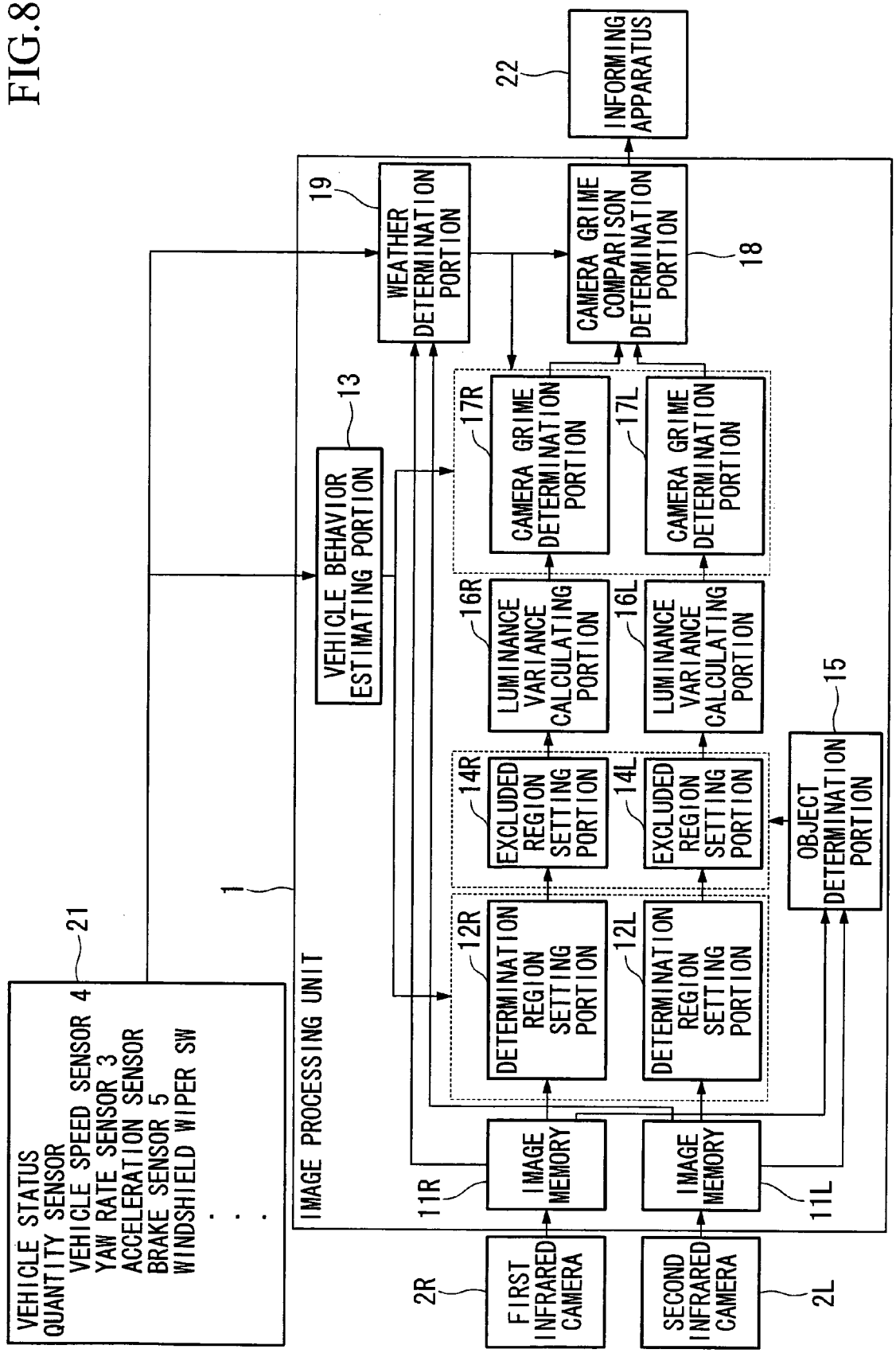
FIG. 8 is a lineblock diagram of the image processing unit according to a modification of the present embodiment.

In this modification, as shown for example in FIG. 8, the image processing unit 1 is equipped with, corresponding to the first and second infrared cameras 2R and 2L, image memories 11R and 11L, determination region setting portions 12R and 12L, a vehicle behavior estimating portion 13, excluded region setting portions 14R and 14L, an object determination portion 15, luminance variance calculating portions 16R and 16L, camera grime determination portions 17R and 17L, a camera grime comparison determination portion 18, and a weather determination portion 19. In particular, the vehicle behavior estimating portion 13 of the image processing unit 1 has a yaw rate sensor 3, a vehicle speed sensor 4, and a brake sensor 5, as well as an acceleration sensor and a windshield wiper switch (windshield wiper SW). The detection signal output from the vehicle status quantity sensor 21 that detects various kinds of vehicle status quantities is input, and an informing apparatus 22 that has a loudspeaker 6 and a display apparatus 7 is connected to the camera grime determination portion 17 of the image processing unit 1.

In this image processing unit 1, each image memory 11R and 11L stores infrared images received from each infrared camera 2R and 2L as digital data.

Each determination region setting portion 12R and 12L sets a determination region on the infrared image based on the optical design (for example, camera angle of view) and installation direction of each infrared camera 2R and 2L established in advance, and as required, corrects the determination region that is set based on the estimation result of the vehicle behavior estimating portion 13, for example, changes in the optical axis caused by displacement in the installation position of the infrared cameras 2R and 2L.

Based on the detection signal output from a vehicle status quantity sensor 21, for each infrared camera 2R and 2L the vehicle behavior estimating portion 13 calculates, as displacement in the installation position and installation direction of the infrared cameras 2R and 2L set in advance, the pan angle that shows, for example, the displacement in the horizontal direction of the optical axis of the infrared cameras 2R and 2L with respect to the vehicle traveling direction, or the pitch angle that shows, for example, displacement in the vertical direction of the optical axis of the infrared cameras 2R and 2L with respect to the vehicle traveling direction that occurs due to pitching of the vehicle.

For example, the vehicle behavior estimating portion 13 calculates an approximated straight line LMV that approximates the relative movement track of a static object detected on an infrared image. With respect to the camera coordinate system (Xc, Yc, Zc) based on the optical axis of each infrared camera 2R and 2L, the angle formed between a straight line formed by the approximated straight line LMV projected on the flat plane Xc-Zc and the Zc axis serves as the pan angle, and the angle formed between the straight line formed by the approximated straight line LMV projected on the flat plane Yc-Zc and the Zc axis serves as the pitch angle.

In addition, the camera coordinate system (Xc, Yc, Zc) is calculated as shown in the numerical expression (1) above, with the center position of the mounting position of the infrared cameras 2R and 2L in front of a vehicle 10 serving as the origin O, and the coordinates on the infrared image set so that the center of the infrared image is the origin, the horizontal direction is the x direction, and the vertical direction is the y direction. Furthermore, the coordinates (xc, yc) are the coordinates that have been converted from the coordinates (x, y) in the reference image (for example, the right image) into the coordinates in a virtual image obtained by aligning the origin O of the real space and the center of the image data so that they coincide, based on the relative position relationship between the mounting position of the infrared camera 2R and the origin O of the real space. Also, in the numerical expression (1) above, the distance between the vehicle 10 and the object, that is, the distance z (m) (object distance) from the lenses of the infrared cameras 2R and 2L to the object, is for example calculated based on the base length of the cameras, that is the horizontal distance D (m) between center positions of each imaging device of the infrared cameras 2R and 2L, the focus distance of the camera, that is, the focus distance f (m) of each lens of the infrared cameras 2R and 2L, the pixel pitch p (m/pixel), and parallax $\Delta d$ (pixel) at pixel level.

Within each determination region set by the determination region setting portions 12R and 12L, the excluded region setting portions 14R and 14L exclude from the grime determination target region, which is described later, regions of high luminance in which the luminance value is not less than a specified luminance value set in accordance with the luminance gain or luminance level of the infrared cameras 2R and 2L set in advance or suitably changed.

Moreover, in the case of a specified heating element detected by the object determination portion 15 (for example, an exhaust pipe of another vehicle or a vending machine and the like) existing within the determination region on the infrared image, the excluded region setting portions 14R and 14L set the region containing this heating element as an excluded region.

For the region other than the excluded regions set by the excluded region setting portions 14R and 14L within each determination region set by the determination region setting portions 12R and 12L, the luminance variance calculating portions 16R and 16L first calculate a luminance histogram that is a frequency variance with respect to luminance value, and then calculate the variance (luminance variance) of the luminance histogram.

Each camera grime determination portion 17R and 17L determines whether or not grime was generated in the infrared cameras 2R and 2L based on the average value of a plurality of luminance variances (luminance variance average value) calculated by the luminance variance calculating portions 16R and 16L over a specified time for example.

For example, each camera grime determination portion 17R and 17L determines whether or not the calculated luminance variance average is less than a specified variance threshold (for example, a value which has hysteresis) set in accordance with the luminance gain or luminance level of the infrared cameras 2R and 2L set in advance or suitably changed. And when this determination result is "YES", it is determined that the contrast (light-and-darkness difference) of the infrared image has dropped and, accordingly, the luminance variance value has fallen due to the occurrence of grime in the optical system of the infrared cameras 2R and 2L, and so as the grime determination result of the infrared cameras 2R and 2L it is determined that grime exists. Meanwhile, when this determination result is "NO", as the grime determination result of the infrared cameras 2R and 2L it is determined that there is no grime.

In addition, when calculating the luminance variance average value, the camera grime determination portions 17R and 17L, based on the detection signal output from the vehicle status quantity sensor 21, selects a suitable luminance variance from the plurality of luminance variances, being enabled to calculate the luminance variance average value solely from the selected luminance variance.

For example, by selecting the luminance variance calculated in a state in which the traveling behavior of the vehicle is relatively stable, or selecting the luminance variance calculated in a state in which the vehicle speed is not less than a specified speed, the camera grime determination portions 17R and 17L can curb decreases in the luminance variance caused by, for example, the distance between the vehicle and a preceding vehicle or a structure becoming relatively short in the state of a relatively low vehicle speed, thereby causing the area of the single preceding vehicle or object to increase excessively on the infrared image.

The camera grime comparison determination portion 18 determines whether or not grime has occurred at the infrared cameras 2R and 2L by comparing the luminance variance average values calculated for each infrared camera 2R and 2L.

For example, the camera grime comparison determination portion 18 determines whether or not the difference between the luminance variance average value of the first infrared camera 2R and the luminance variance average value of the second infrared camera 2L is less than a specified variance threshold (for example, a value which has hysteresis) set in accordance with the luminance gain or luminance level of each infrared camera 2R and 2L set in advance or suitably changed. And when this determination result is "YES", due to the occurrence of grime in the optical system of the first or second infrared cameras 2R and 2L, it is determined that the contrast (light-and-darkness difference) of one infrared image has relatively dropped compared to the contrast of the other infrared image, and consequently that the difference between the luminance variance average values has increased. Therefore, as the grime comparison determination result, grime is determined to exist on one of the first or second infrared cameras 2R and 2L and not exist on the other.

When it is determined by the camera grime determination portion 17 that grime is present in the infrared cameras 2R and 2L, or when it is determined by the camera grime comparison determination portion 18 that grime is present on either one of the first infrared camera 2R or the second infrared cameras 2L, the informing apparatus 22 outputs an audible warning such as an alarm sound or alarm voice via the loudspeaker 6 or a visual warning such as a display via the display apparatus 7.

In addition, each camera grime determination portion 17R and 17L and the camera grime comparison determination portion 18 determines whether or not there is the state of determination that grime exists in the infrared cameras 2R and 2L in accordance with the determination result of the weather determination portion 19, for example the determination result for the state of the weather such as a rainfall and snowfall based on the detection signal according to ON/OFF of actuation of the windshield wiper output from the windshield wiper switch (windshield wiper SW) of the vehicle status quantity sensor 21. When this determination result is "YES", it alters the information content from the informing apparatus 22 or temporarily suspends the process that determines the presence of grime.

The abnormality detecting apparatus for an imaging apparatus according to the present modification is provided with the construction described above. Next, the operation of the abnormality detecting apparatus for an imaging apparatus, particularly the process to determine the presence of grime in each infrared camera 2R and 2L, is described with reference to the drawings.

Figure 9:
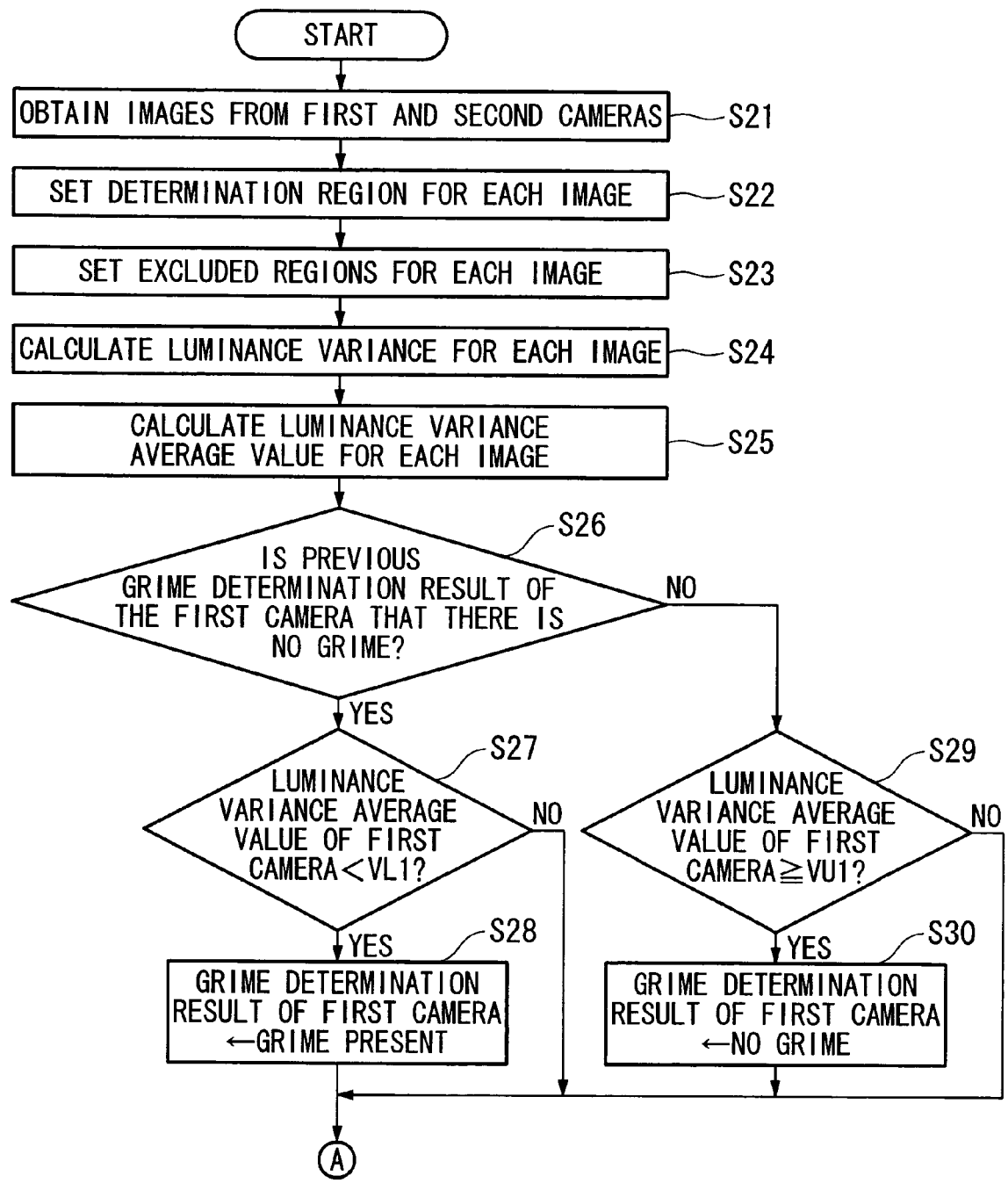
FIG. 9 is a flowchart showing the operation of the abnormality detecting apparatus for an imaging apparatus according to the modification of the present embodiment.
Figure 10:
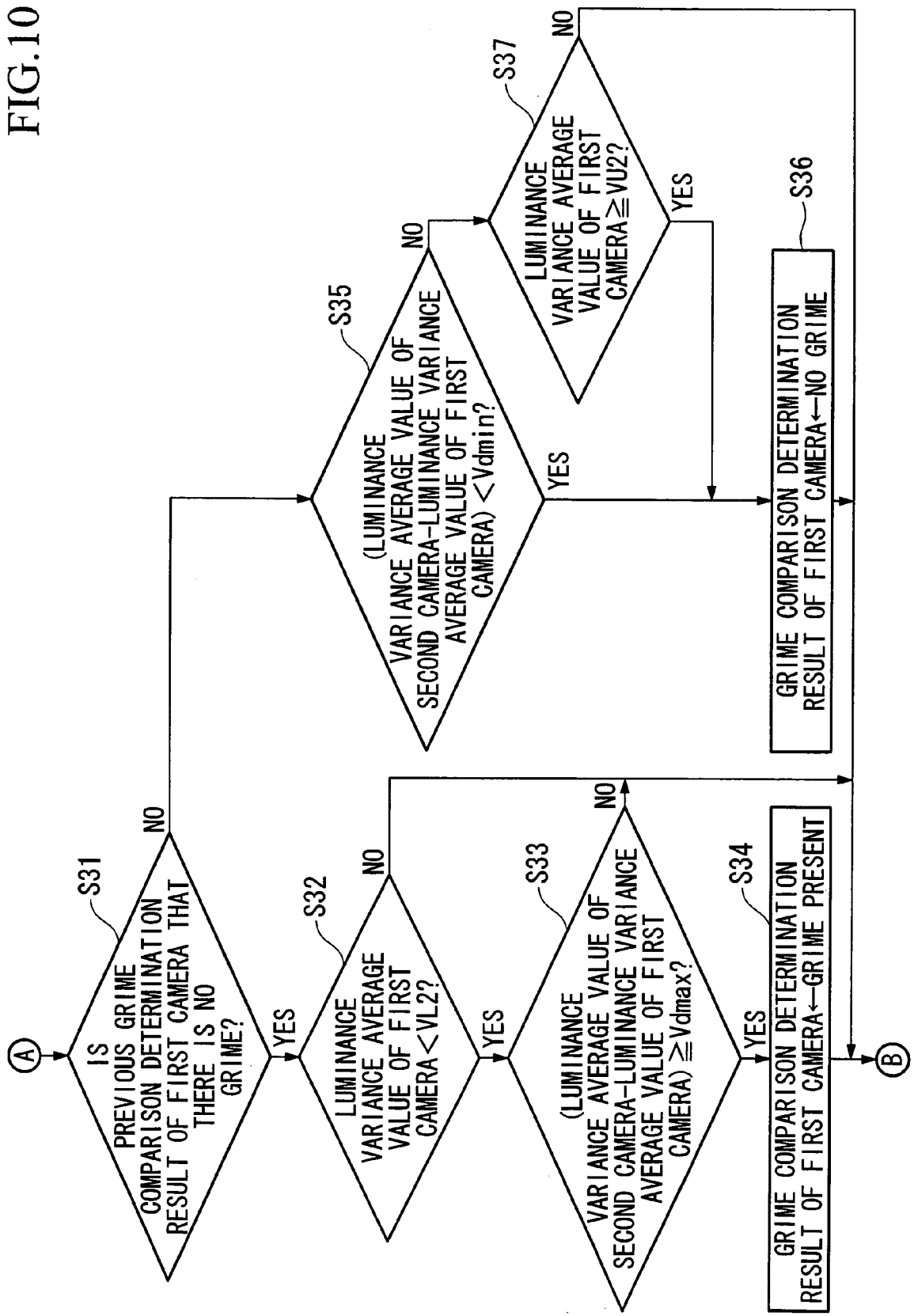
FIG. 10 is a flowchart showing the operation of the abnormality detecting apparatus for an imaging apparatus according to the modification of the present embodiment.
Figure 11:
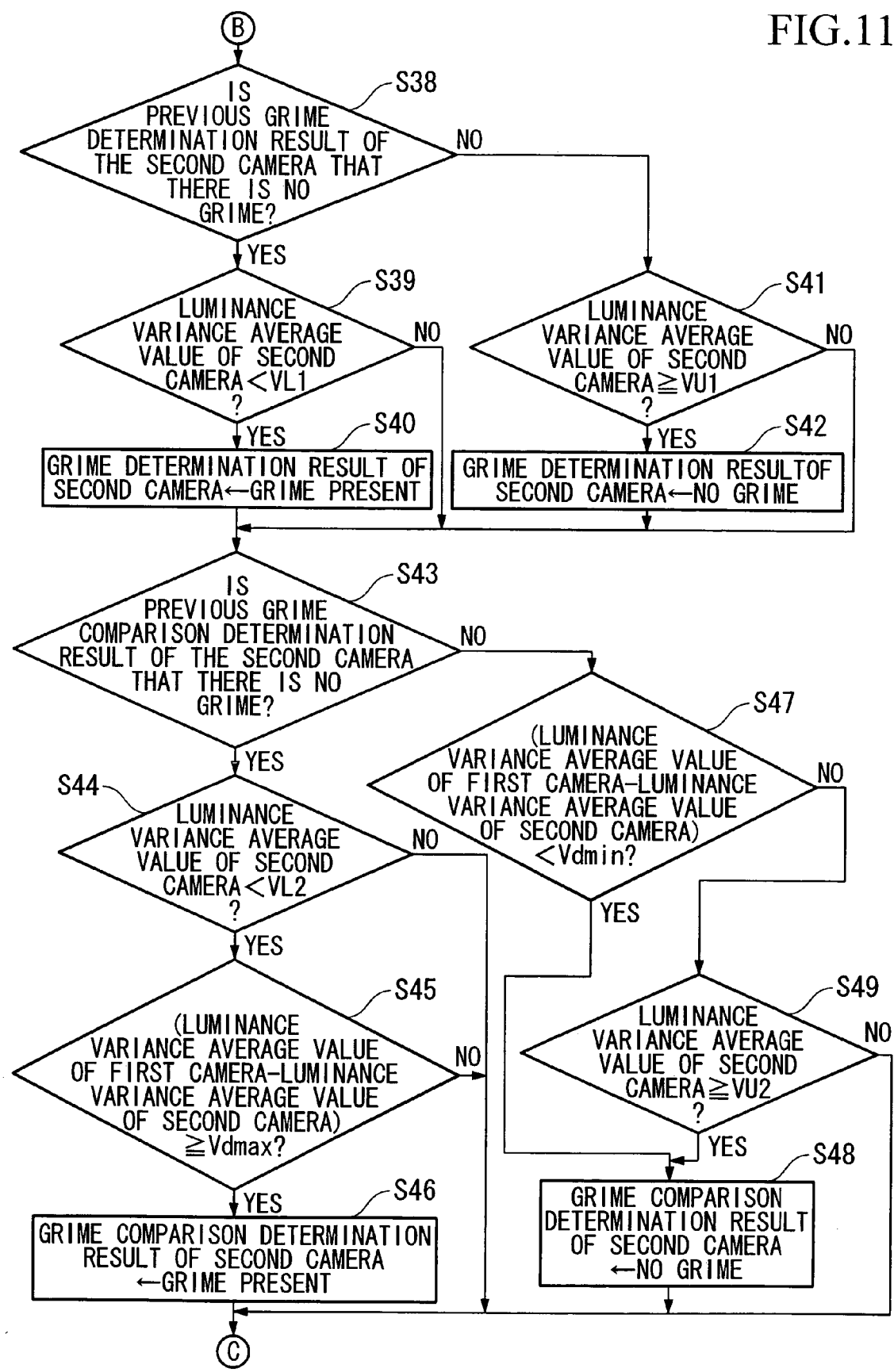
FIG. 11 is a flowchart showing the operation of the abnormality detecting apparatus for an imaging apparatus according to the modification of the present embodiment.
Figure 12:
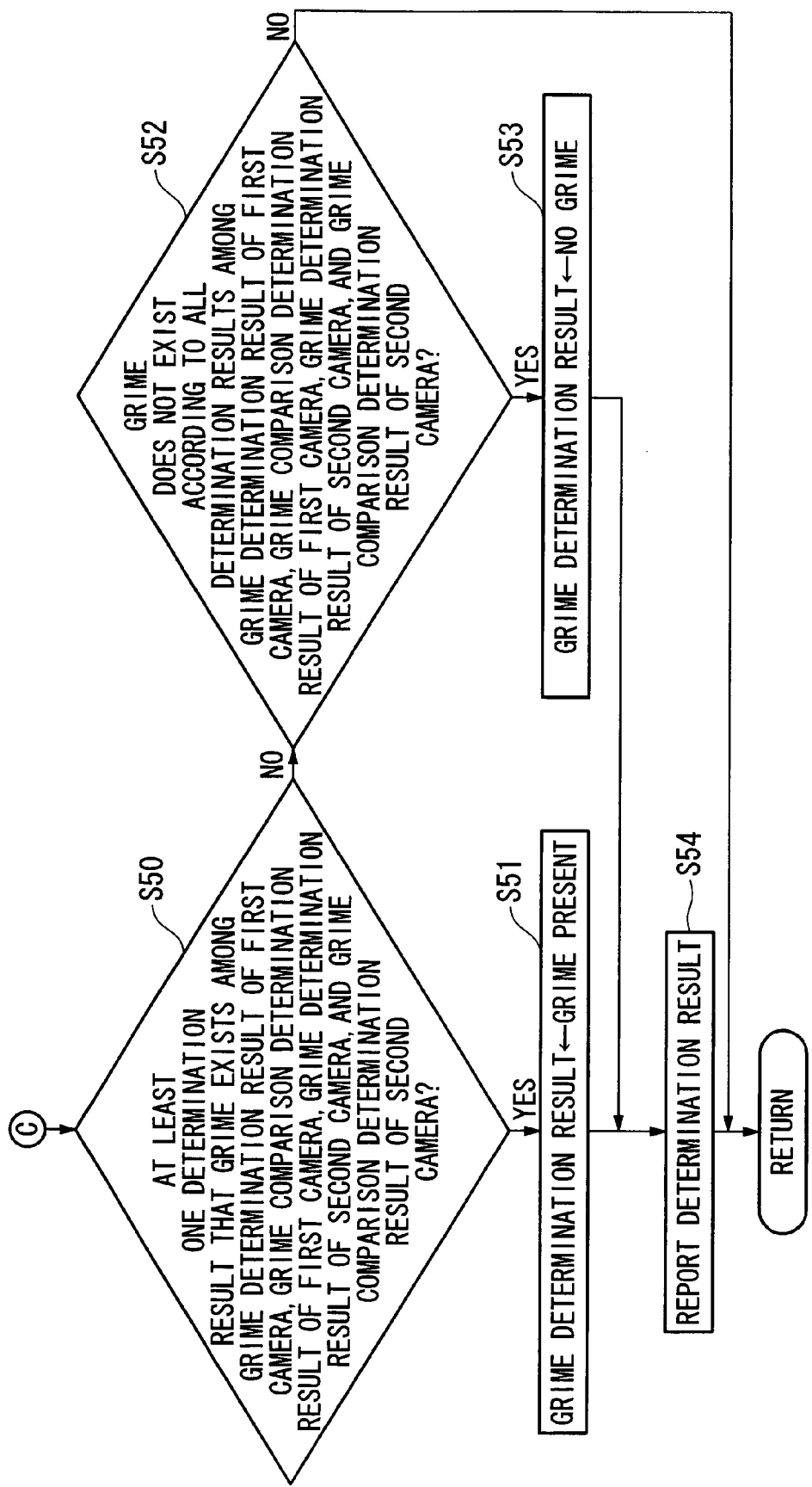
FIG. 12 is a flowchart showing the operation of the abnormality detecting apparatus for an imaging apparatus according to the modification of the present embodiment.

First of all, in step S21 shown in FIG. 9, an infrared image is obtained from each infrared camera 2R and 2L.

Next, in step S22, a determination region including at least the road R, the boundary portion of the road BR and the background portion B is set on each obtained infrared image.

Next, in step S23, high luminance regions in which the luminance value is not less than a prescribed luminance value are set as excluded regions within the determination region.

Next, in step S24, a luminance histogram is calculated for the region other than the excluded regions within each determination region, and the variance of the luminance histogram (luminance variance) is calculated.

Next, in step S25, the average value of a plurality of luminance variances (luminance variance average value) calculated over a specified time is calculated for each infrared camera 2R and 2L.

Next, in step S26, it is determined whether or not it was determined in the previous process that there is no grime, as the grime determination result for the first infrared camera 2R.

When this determination result is "NO", the flow proceeds to step S29 that is described later.

On the other hand, when the determination result is "YES", the flow proceeds to step S27.

In step S27, it is determined whether or not the luminance variance average value of the first infrared camera 2R is less than a specified lower limit variance threshold value VL1 set in accordance with the luminance gain or luminance level of the first infrared camera 2R set in advance or suitably changed.

When this determination result is "NO", the flow proceeds to step S31 that is described later.

On the other hand, when the determination result is "YES", the flow proceeds to step S28.

In step S28, the setting is made that grime exists as the grime determination result of the first infrared camera 2R, and the flow proceeds to step S31 described later.

In step S29, it is determined whether or not the luminance variance average value of the first infrared camera 2R is not less than a specified upper limit variance threshold value VU1 set in accordance with the luminance gain or luminance level of the first infrared camera 2R set in advance or suitably changed.

When this determination result is "NO", flow proceeds to step S31 described later.

On the other hand, when the determination result is "YES", the flow proceeds to step S30.

In step S30, the setting is made that grime does not exist as the grime determination result of the first infrared camera 2R, and the flow proceeds to step S31.

In step S31, it is determined whether or not it was determined that there is no grime in the first infrared camera 2R as the grime comparison determination result in the previous process.

When this determination result is "NO", flow proceeds to step S35 described later.

On the other hand, when the determination result is "YES", the flow proceeds to step S32.

In step S32, it is determined whether or not the luminance variance average value of the first infrared camera 2R is less than a specified lower limit variance threshold value VL2 set in accordance with the luminance gain or luminance level of the first infrared camera 2R set in advance or suitably changed.

When this determination result is "NO", the flow proceeds to step S38 that is described later.

On the other hand, when the determination result is "YES", the flow proceeds to step S33.

In step S33, it is determined whether or not the value obtained by subtracting the luminance variance average value of the first infrared camera 2R from the luminance variance average value of the second infrared camera 2L is not less than a specified upper limit difference threshold value Vdmax set in accordance with the luminance gain or luminance level of each infrared camera 2R and 2L set in advance or suitably changed.

When this determination result is "NO", the flow proceeds to step S38 that is described later.

On the other hand, when the determination result is "YES", the flow proceeds to step S34.

In step S34, the setting is made that grime exists as the grime comparison determination result of the first infrared camera 2R, and the flow proceeds to step S38 that is described later.

In step S35, it is determined whether or not the value obtained by subtracting the luminance variance average value of the first infrared camera 2R from the luminance variance average value of the second infrared camera 2L is less than a specified lower limit difference threshold value Vdmin set in accordance with the luminance gain or luminance level of each infrared camera 2R and 2L set in advance or suitably changed.

When this determination result is "NO", the flow proceeds to step S37 that is described later.

On the other hand, when the determination result is "YES", the flow proceeds to step S36.

In step S36, the setting is made that grime does not exist as the grime comparison determination result of the first infrared camera 2R, and the flow proceeds to step S38 that is described later.

In step S37, it is determined whether or not the luminance variance average value of the first infrared camera 2R is not less than a specified upper limit variance threshold value VU2 set in accordance with the luminance gain or luminance level of the first infrared camera 2R set in advance or suitably changed.

When this determination result is "NO", the flow proceeds to step S38 that is described later.

On the other hand, when the determination result is "YES", the flow proceeds to the aforementioned step S36.

Next, in step S38, it is determined whether or not it was determined in the previous process that there is no grime, as the grime determination result for the second infrared camera 2L.

When this determination result is "NO", the flow proceeds to step S41 that is described later.

On the other hand, when the determination result is "YES", the flow proceeds to step S39.

In step S39, it is determined whether or not the luminance variance average value of the second infrared camera 2L is less than a specified lower limit variance threshold value VL1 set in accordance with the luminance gain or luminance level of the second infrared camera 2L set in advance or suitably changed.

When this determination result is "NO", the flow proceeds to step S43 that is described later.

On the other hand, when the determination result is "YES", the flow proceeds to step S40.

In step S40, the setting is made that grime exists as the grime determination result of the second infrared camera 2L, and the flow proceeds to step S43 that is described later.

In step S41, it is determined whether or not the luminance variance average value of the second infrared camera 2L is not less than a specified upper limit variance threshold value VU1 set in accordance with the luminance gain or luminance level of the second infrared camera 2L set in advance or suitably changed.

When this determination result is "NO", the flow proceeds to step S43 that is described later.

On the other hand, when the determination result is "YES", the flow proceeds to step S42.

In step S42, the setting is made that grime does not exist as the grime determination result of the second infrared camera 2L, and the flow proceeds to step S43.

In step S43, it is determined whether or not it was determined that there is no grime in the second infrared camera 2L as the grime comparison determination result in the previous process.

When this determination result is "NO", flow proceeds to step S47 described later.

On the other hand, when the determination result is "YES", the flow proceeds to step S44.

In step S44, it is determined whether or not the luminance variance average value of the second infrared camera 2L is less than a specified lower limit variance threshold value VL2 set in accordance with the luminance gain or luminance level of the second infrared camera 2L set in advance or suitably changed.

When this determination result is "NO", the flow proceeds to step S50 that is described later.

On the other hand, when the determination result is "YES", the flow proceeds to step S45.

In step S45, it is determined whether or not the value obtained by subtracting the luminance variance average value of the second infrared camera 2L from the luminance variance average value of the first infrared camera 2R is not less than a specified upper limit difference threshold value Vdmax set in accordance with the luminance gain or luminance level of each infrared camera 2R and 2L set in advance or suitably changed.

When this determination result is "NO", the flow proceeds to step S50 that is described later.

On the other hand, when the determination result is "YES", the flow proceeds to step S46.

In step S46, the setting is made that grime exists as the grime comparison determination result of the second infrared camera 2L, and the flow proceeds to step S50 that is described later.

In step S47, it is determined whether or not the value obtained by subtracting the luminance variance average value of the second infrared camera 2L from the luminance variance average value of the first infrared camera 2R is less than a specified lower limit difference threshold value Vdmin set in accordance with the luminance gain or luminance level of each infrared camera 2R and 2L set in advance or suitably changed.

When this determination result is "NO", the flow proceeds to step S49 that is described later.

On the other hand, when the determination result is "YES", the flow proceeds to step S48.

In step S48, the setting is made that grime does not exist as the grime comparison determination result of the second infrared camera 2L, and the flow proceeds to step S50 that is described later.

In step S49, it is determined whether or not the luminance variance average value of the second infrared camera 2L is not less than a specified upper limit variance threshold value VU2 set in accordance with the luminance gain or luminance level of the second infrared camera 2L set in advance or suitably changed.

When this determination result is "NO", the flow proceeds to step S50 that is described later.

On the other hand, when the determination result is "YES", the flow proceeds to the aforementioned step S48.

In step S50, it is determined whether or not it was determined that grime exists by at least any determination result among the grime determination result of the first infrared camera 2R, the grime comparison determination result of the first infrared camera 2R, the grime determination result of the second infrared camera 2L, and the grime comparison determination result of the second infrared camera 2L.

When the determination result is "YES", the flow proceeds to step S51. In this step S51, the setting is made for the grime determination result that grime exists, that is, there is grime for at least one of the infrared cameras 2R and 2L, and the flow proceeds to step S54 described later.

On the other hand, when the determination result is "NO", the flow proceeds to step S52.

In step S52, it is determined whether or not it was determined that there is no grime according to all the determination results of the grime determination result of the first infrared camera 2R, the grime comparison determination result of the first infrared camera 2R, the grime determination result of the second infrared camera 2L, and the grime comparison determination result of the second infrared camera 2L.

When the determination result is "YES", the flow proceeds to step S53. In this step S53, the setting is made for the grime determination result that there is no grime, that is, there is no grime in both of the infrared cameras 2R and 2L, and the flow proceeds to step S54 described later.

On the other hand, when this determination result is "NO", the processing is terminated.

In step S54, the grime determination result is reported to the driver of the vehicle via the informing apparatus 22, and the processing is terminated.

As stated above, the aforementioned abnormality detecting apparatus for an imaging apparatus of this modification can relatively detect the presence of abnormalities in each infrared camera 2R and 2L regardless of the setting state of each infrared camera 2R and 2L. Moreover, since the presence of abnormalities is detected in the imaging apparatus in accordance with the difference between luminance variance average values of images, in addition to the luminance variance average values of images, for example, even in the case that the difference between the luminance variance average values of images is not above a specified value, and the corresponding infrared cameras 2R and 2L are determined to be normal, in the case that the luminance variance average values of the images are less than a specified value, it can determine that the corresponding infrared cameras 2R and 2L are in an abnormal state.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An abnormality detecting apparatus for an imaging apparatus having a plurality of imaging apparatuses, that detects a presence of abnormalities in said imaging apparatuses, said abnormality detecting apparatus comprising:
   a luminance variance value calculating device that calculates a luminance variance value of each image from the imaging apparatuses using the luminance value of each image obtained by the imaging apparatuses;
   a variance value difference calculating device that calculates a difference between the luminance variance values of images from each of the imaging apparatuses; and
   an abnormality detecting device that detects the presence of abnormalities in any of the imaging apparatuses in accordance with the luminance variance values calculated by the luminance variance value calculating device;
   wherein said imaging apparatuses are mounted on a vehicle for capturing images of vehicle surroundings; and
   wherein the abnormality detecting device detects the presence of abnormalities in any of the imaging apparatuses in accordance with the luminance variance value calculated by the luminance variance value calculating device and the difference calculated by the variance value difference calculating device.

2. The abnormality detecting apparatus for an imaging apparatus according to claim 1, wherein said luminance variance value calculating device calculates the luminance value of each image obtained by the imaging apparatuses as a luminance histogram involving a frequency variance with respect to luminance value, and calculates the luminance variance value using the calculated luminance histogram.

3. The abnormality detecting apparatus for an imaging apparatus according to claim 1, wherein the abnormality detecting device detects the presence of grime in an optical system of any of the imaging apparatuses in accordance with the luminance variance values calculated by the luminance variance value calculating device.

4. The abnormality detecting apparatus for an imaging apparatus according to claim 1, wherein the abnormality detecting device detects the presence of grime in an optical system of any of the imaging apparatuses based on an average value of a plurality of the luminance variance values calculated by the luminance variance value calculating device over a preset time.

5. The abnormality detecting apparatus for an imaging apparatus according to claim 1, further comprising: a determination region setting device which sets a target determination region comprising a specified region on each image obtained from the imaging apparatuses and the luminance variance value calculating device calculates the luminance variance value of the target determination region of each image; and an excluded region setting portion which excludes from the target determination region on each image obtained from the imaging apparatuses any region of high luminance having a luminance value≧a preset value.

6. The abnormality detecting apparatus for an imaging apparatus according to claim 1, further comprising: a vehicle behavior estimating portion which determines whether sensed behavior of the vehicle is appropriate for detecting the presence of abnormalities in any of the imaging apparatuses, and the abnormality detecting apparatus suspends an abnormality detecting operation when the sensed behavior of the vehicle is not appropriate for detecting the presence of abnormalities.

7. The abnormality detecting apparatus for an imaging apparatus according to claim 6, wherein the vehicle behavior estimating portion comprises at least one of a yaw rate sensor, a vehicle speed sensor, a brake sensor, an acceleration sensor, and a windshield wiper switch.

8. The abnormality detecting apparatus for an imaging apparatus according to claim 1, further comprising at least one of audible or visual warning-generating alarm mechanisms for generating an audible or visual alarm when an abnormality is detected.

9. The abnormality detecting apparatus for an imaging apparatus according to claim 1, comprising two imaging apparatuses mounted on a front portion of the vehicle, wherein optical axes of the imaging apparatuses are substantially parallel to each other and at substantially a same height from a road.

10. An abnormality detecting apparatus, for an imaging apparatus comprising a first imaging apparatus and a second imaging apparatus, that detects a presence of abnormalities in said first imaging apparatus and said second imaging apparatus, said abnormality detecting apparatus comprising:
- a first luminance variance value calculating device that calculates a luminance variance value of each image using a luminance value of each image obtained by the first imaging apparatus;
- a second luminance variance value calculating device that calculates a luminance variance value of each image using a luminance value of each image obtained by the second imaging apparatus;
- a variance difference calculating device that calculates a difference of luminance variance value between the image from the first imaging apparatus and the image from the second imaging apparatus, based on the luminance variance value of each image from the first imaging apparatus and the luminance variance value of each image from the second imaging apparatus;
- a first abnormality detecting device that detects the presence of abnormalities in the first imaging apparatus and the second imaging apparatus based on the difference of luminance variance value calculated by the variance difference calculating device; and
- a second abnormality detecting device that detects the presence of abnormalities in the first imaging apparatus and the second imaging apparatus based on the luminance variance value of each image from the first imaging apparatus and the luminance variance value of each image from the second imaging apparatus;

wherein said first imaging apparatus and said second imaging apparatus are mounted on a vehicle for capturing images of vehicle surroundings.

11. The abnormality detecting apparatus for an imaging apparatus according to claim 10, wherein said first and second luminance variance value calculating devices calculate the luminance value of each image obtained by the first and second imaging apparatuses as a luminance histogram involving a frequency variance with respect to luminance value, and calculate the luminance variance value using the calculated luminance histogram.

12. The abnormality detecting apparatus for an imaging apparatus according to claim 10, wherein the first and second abnormality detecting devices detects the presence of grime in an optical system of the first and second imaging apparatuses in accordance with the luminance variance values calculated by the first and second luminance variance value calculating devices.

13. The abnormality detecting apparatus for an imaging apparatus according to claim 10, wherein the first and second abnormality detecting device detects the presence of grime in an optical system of the first and second imaging apparatuses based on an average value of a plurality of the luminance variance values calculated by the first and second luminance variance value calculating devices over a preset time.

14. The abnormality detecting apparatus for an imaging apparatus according to claim 10, further comprising: first and second determination region setting devices which set a target determination region comprising a specified region on each image obtained from the first and second imaging apparatuses and the first and second luminance variance value calculating devices calculate the luminance variance value of the target determination region of each image; and first and second excluded region setting portions which exclude from the target determination regions on each image obtained from the first and second imaging apparatuses any region of high luminance having a luminance≧value a preset value.

15. The abnormality detecting apparatus for an imaging apparatus according to claim 10, further comprising: a vehicle behavior estimating portion which determines whether sensed behavior of the vehicle is appropriate for detecting the presence of abnormalities in the first and second imaging apparatuses, and the abnormality detecting apparatus suspends an abnormality detecting operation when the sensed behavior of the vehicle is not appropriate for detecting the presence of abnormalities.

16. The abnormality detecting apparatus for an imaging apparatus according to claim 15, wherein the vehicle behavior estimating portion comprises at least one of a yaw rate sensor, a vehicle speed sensor, a brake sensor, an acceleration sensor, and a windshield wiper switch.

* * * * *

UNITED STATES PATENT AND TRADEMARK OFFICE
CERTIFICATE OF CORRECTION

PATENT NO.      : 7,619,668 B2
APPLICATION NO. : 11/287739
DATED           : November 17, 2009
INVENTOR(S)     : Saka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Twenty-sixth Day of October, 2010

David J. Kappos
*Director of the United States Patent and Trademark Office*